United States Patent [19]
DeArras et al.

[11] Patent Number: 5,659,761
[45] Date of Patent: Aug. 19, 1997

[54] DATA RECOGNITION APPARATUS AND PORTABLE DATA READER HAVING POWER MANAGEMENT SYSTEM

[75] Inventors: James M. DeArras; Vernon L. Stant, both of Richmond, Va.; Lawrence R. Ober; Bengt E. Salmonsson, both of Charlotte, N.C.; Joseph W. Lowe, Dunwoody, Ga.; Walter C. Simciak, Winston-Salem; David P. Gibbon, Charlotte, both of N.C.

[73] Assignee: Hand Held Products, Charlotte, N.C.

[21] Appl. No.: 324,980

[22] Filed: Oct. 18, 1994

[51] Int. Cl.⁶ .................................................. G06F 13/00
[52] U.S. Cl. ............................................................ 395/750
[58] Field of Search ........................ 395/750; 364/707; 379/59

[56] References Cited

U.S. PATENT DOCUMENTS

| | | | |
|---|---|---|---|
| 4,143,417 | 3/1979 | Wald et al. | 364/900 |
| 4,160,156 | 7/1979 | Sherer | 235/463 |
| 4,317,181 | 2/1982 | Teza et al. | 364/707 |
| 4,365,290 | 12/1982 | Nelms et al. | 364/200 |
| 4,521,678 | 6/1985 | Winter | 235/472 |
| 4,850,009 | 7/1989 | Zook et al. | 379/96 |
| 5,021,679 | 6/1991 | Fairbanks et al. | 307/66 |
| 5,142,684 | 8/1992 | Perry et al. | 395/750 |
| 5,167,024 | 11/1992 | Smith et al. | 395/375 |
| 5,182,810 | 1/1993 | Bartling et al. | 395/750 |
| 5,189,291 | 2/1993 | Siemiatkowski | 235/472 |
| 5,231,273 | 7/1993 | Caswell et al. | |
| 5,280,162 | 1/1994 | Marwin | 235/462 |
| 5,283,905 | 2/1994 | Saadeh et al. | 395/750 |
| 5,331,136 | 7/1994 | Koenck et al. | |
| 5,341,503 | 8/1994 | Gladstein et al. | 395/750 |
| 5,423,045 | 6/1995 | Kannan et al. | 395/750 |

FOREIGN PATENT DOCUMENTS

| | | |
|---|---|---|
| 2196766 | 5/1988 | United Kingdom . |
| WO93/25955 | 12/1993 | WIPO . |
| WO94/12938 | 6/1994 | WIPO . |

*Primary Examiner*—Gopal C. Ray
*Assistant Examiner*—John Travis
*Attorney, Agent, or Firm*—Bell, Seltzer, Park & Gibson

[57] ABSTRACT

A data recognition apparatus of the invention preferably has a data communication apparatus and a portable data reader adapted to communicate therewith. The portable data reader is particularly adapted to substantially extend the time period required before replacing or recharging a portable power source connected thereto. The portable data reader preferably includes a data sensor, a central processor, a display, a user interface, a transceiver, a timer, a portable power source, and a power manager. The power manager is connected in electrical communication with the portable power source, the data sensor, the central processor, the display, the user interface, and the transceiver and the central processor is connected in electrical communication with the timer. The power manager manages the amount of and timing of power supplied to the data sensor, the central processor, the display, and the transmitter and receiver responsive to command signals received from the central processor and interaction of a user with the user interface. The power manager also preferably provides at least four modes of predetermined power operation of the central processor, the display, and the user interface. A method of managing power for such a portable data reader are also included.

7 Claims, 11 Drawing Sheets

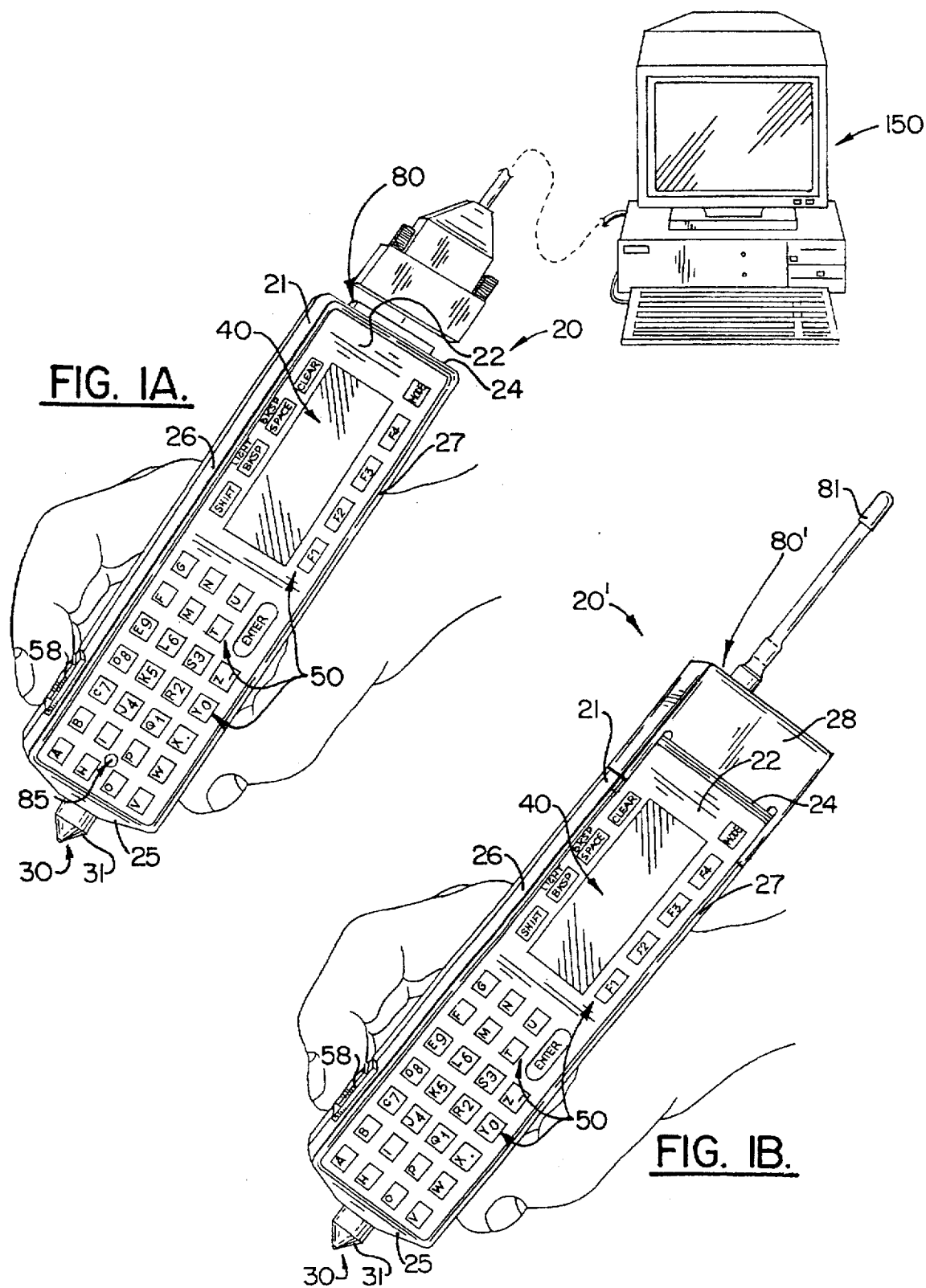

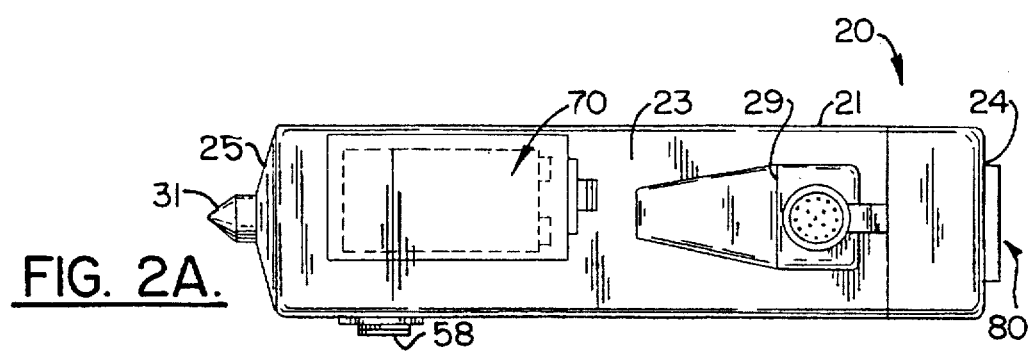
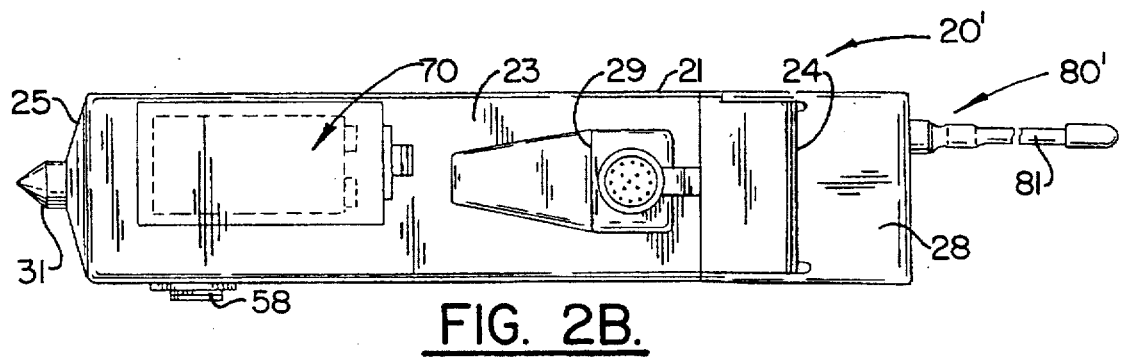

DATA RECOGNITION APPARATUS AND PORTABLE DATA READER HAVING POWER MANAGEMENT SYSTEM

FIELD OF THE INVENTION

This invention relates to a data recognition apparatus and methods, and more particularly to an apparatus including a portable data reader and method of managing power for such an apparatus.

BACKGROUND OF THE INVENTION

Various systems and methods of data recognition are known to those skilled in the art, including portable systems for optically sensing and decoding data. Examples of such systems may be seen in U.S. Pat. No. 4,143,417 titled *"Portable Data-Gathering Apparatus Formed by Modular Components Having Operate-Standby Modes"* by Wald et al.; U.S. Pat. No. 4,521,678 titled *"Battery-Powered Optical Bar Code Reader and Voltage Regulator Therefor"* by Winter; U.S. Pat. No. 4,160,156 titled *"Method and Apparatus for Reading Bar Coded Data Wherein the Light Source is Periodically Energized"* by Sherer; and U.S. Pat. No. 5,189,291 titled *"Bar Code Reader Operable as Remote Scanner or with Fixed Terminal"* by Siemiatkowski. Portable systems have been used for data collection in a broad range of operations, including inventory control in retail stores and in the tracking of packages or cargo in the delivery industry. Portable optical reading units are typically battery powered or attached to a terminal station which supplies a power source.

Codes have been produced, and printed on products or containers, to increase the accuracy of such data collection systems. One such code is a "bar code" which may be read by passing an optical sensing unit over the bar code on the product or by passing the product over the optical sensing unit. A bar code typically consists of a pattern of black and white bars of varying widths, with the encoded information determined by the sequence of these varying width bars. Bars are scanned by the optical sensing unit and the widths of the bars are then translated into a specific identifying sequence for that particular item.

An optical sensing unit typically requires a source of radiation to illuminate the bar coded data which normally places a significant drain on the battery. As the applications of these portable optical sensing units continue to expand, users of such units continue to demand more capabilities, lighter weight, lower cost, and extended usage time from these units. Hence, the amount of power used by the radiation source, accompanying sensing, decoding, and other data processing circuits, data transmission circuits, and the display of decoded or user interface data continue to be a major obstacle in expanding applications.

SUMMARY OF THE INVENTION

It is therefore an object of the present invention to provide a data recognition apparatus including a portable data reader having extended use without a requirement of replacing or recharging a portable power source connected thereto.

It is another object of the invention to provide a data recognition system including a portable data reader and methods of managing power for such a data reader.

It is still another object of the present invention to provide a portable data reader having a power management system which includes a power supply that substantially extends the use of the data reader without a requirement of replacing or recharging a battery power source or the like.

These and other objects of the present invention are provided by a data recognition apparatus that has a data communication apparatus and a portable data reader adapted to communicate therewith. The data recognition apparatus may also have a plurality of portable data readers positioned for communication with the data communication apparatus. Each of the portable data readers are preferably constructed and designed to substantially extend the time period required before replacing or recharging a portable power source connected to the data reader. The data communication apparatus is preferably positioned remote from the portable data reader and is adapted to communicate therewith. The data communication apparatus, as well as the portable data reader, each has transmitting and receiving means connected thereto for transmitting and receiving data therebetween.

A portable data reader according to the invention preferably includes a data sensor, a central processor, a display, a user interface, transmitting and receiving means, such as a transceiver, a timer, a portable power source such as a battery, and a power manager. Additionally, the data reader may also include illumination means, such as backlighting, for illuminating the display and a sound source adapted for acoustically communicating with user predetermined signals such as a tone, or other information. The power manager is connected in electrical communication with the portable power source, the data sensor, the central processor, the display, the user interface, the sound source, the backlighting, and the timer. The power manager manages the amount of and timing of power supplied to the data sensor, the central processor, the display, the backlighting, the sound source, and the transceiver responsive to command signals from the central processor and interaction of a user with the user interface.

Also according to the invention, the power manager preferably includes a power supply circuit positioned in electrical communication with the portable power source and the central processor. A memory circuit is preferably positioned in electrical communication with the central processor. The memory circuit preferably is responsive to command signals received from the central processor, and responsively provides predetermined commands related to power management to the central processor.

The power manager also preferably has at least four modes of predetermined power operation for the central processor, the display, and the user interface. The first power mode has the central processor inactive, the display in an off-state, and the user interface inactive. The second power mode has the central processor inactive, the display in an off-state, and the user interface active. The third power mode has the central processor inactive, the display in an on-state, and the user interface active. The fourth mode has the central processor active, the display in an on-state, and the user interface active. The power manager of the portable data reader also provides various levels of operational power to the data sensor, the central processor, the display, transmitting and receiving means, the user interface, the sound source, and the illumination means to thereby substantially decrease the power required to operate the reader. For example, by lowering the power required to operate these various elements of the reader, the period of time before recharging or replacing a battery may be substantially extended, i.e., from a conventional time of about two hours during heavy use to a worker's full eight-hour shift or more.

The present invention further provides a method of managing power within a portable data reader which includes a data sensor, a central processor, a display, a user interface, a timer, a portable power source, a power supply circuit, and a memory circuit. The method preferably includes supplying power from a portable power source to a power supply circuit electrically connected thereto. The power supply circuit responsively provides electrical signals to a central processor, a memory circuit, a display, and a data sensor. A memory circuit receives and responsively provides command signals to the central processor. The central processor supplies predetermined commands to the power supply circuit responsive to electrical and command signals received from the memory circuit, the power supply circuit, timing signals received from the timer, and user interaction with the user interface. The power supply circuit then supplies only a predetermined amount of power from the power supply to the central processor, the display, and the data sensor responsive to the predetermined commands supplied to the power supply circuit from the central processor.

BRIEF DESCRIPTION OF THE DRAWINGS

Some of the objects and advantages of the present invention having been stated, others will be more fully understood from the detailed description that follows, and by reference to the accompanying drawings in which:

FIG. 1A illustrates a front perspective view of a data recognition apparatus including a data communication apparatus and a portable data reader positioned in the hand of a user according to a first embodiment of the present invention;

FIG. 1B illustrates a front, perspective view of a portable data reader according to a second embodiment of the present invention positioned in the hand of a user;

FIG. 2A illustrates a back elevational view of a portable data reader according to a first embodiment of the present invention;

FIG. 2B illustrates a back elevational view of a portable data reader according to a second embodiment of the present invention;

DESCRIPTION OF PREFERRED EMBODIMENTS

Figure 3A:
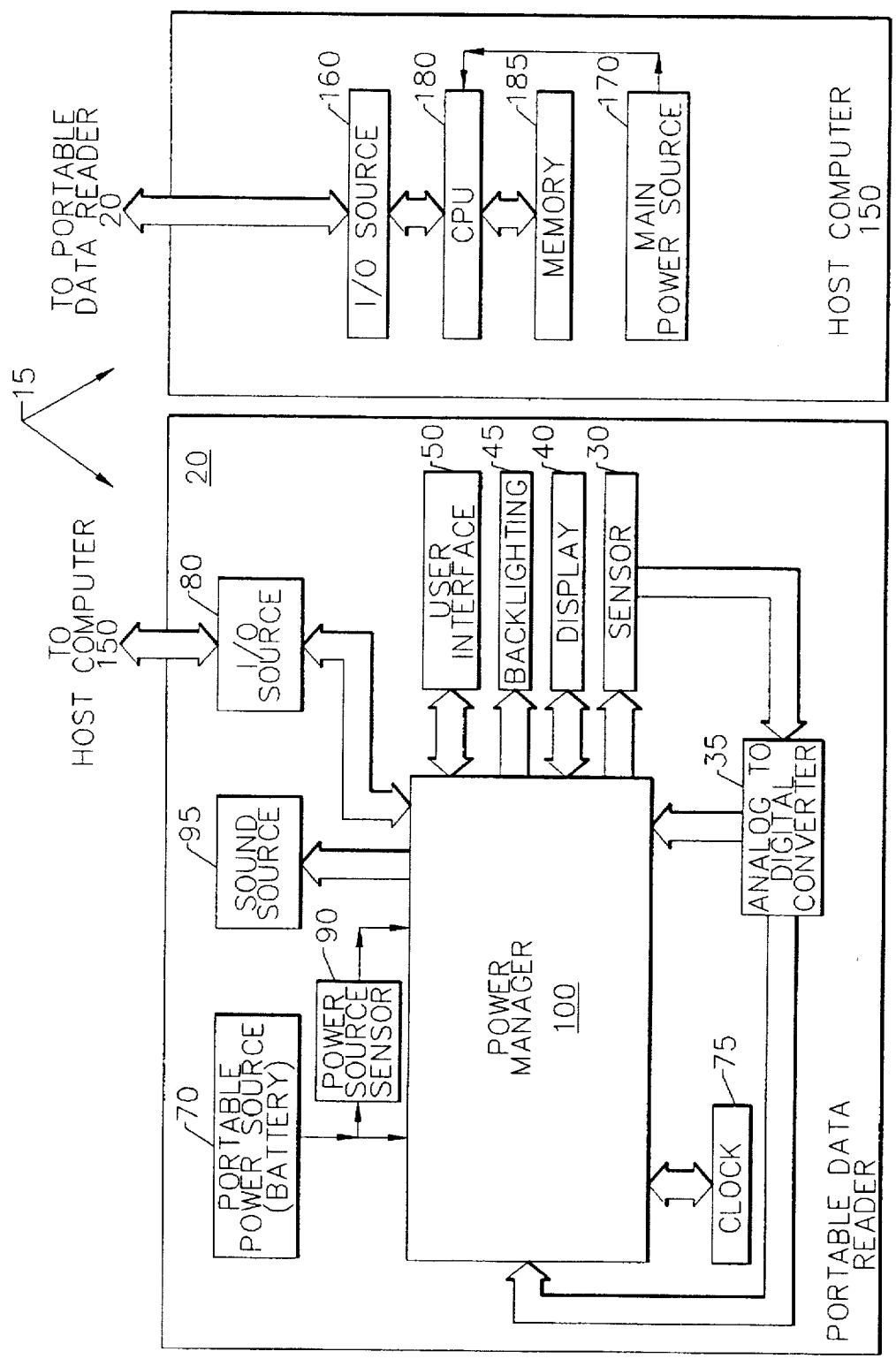
FIG. 3A schematically illustrates a data recognition apparatus including a portable data reader according to a first or second embodiment of the present invention.

The present invention will now be described more fully hereinafter with reference to the accompanying drawings, in which preferred embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

FIGS. 1–3A and 7 illustrate a data recognition apparatus 15 for sensing and decoding data according to first and second embodiments of the invention. The data recognition apparatus 15 preferably includes a data communication apparatus 150, such as a host computer illustrated, and one or more portable data readers 20, 20' positioned in communication therewith. Where a plurality of data readers 20' are used that remotely communicate with the host computer 150', the second embodiment of the invention such as best illustrated in FIGS. 1B, 2B, 3A–3B, and 7–8 is preferred. According to a first embodiment of the present invention, as best illustrated in FIGS. 1A, 2A, and 3A–3B, the portable data reader 20 preferably communicates with the data communication apparatus 150 via a mechanical interface 80, i.e., an RS-232 data link, and communication circuits positioned within the respective data communication apparatus 150 and the portable data reader 20. On the other hand, according to a second embodiment of the invention, the portable data reader 20' remotely communicates with the data communication apparatus 150' by radio frequency ("RF") communication. The data communication apparatus 150' and the portable data reader 20' each preferably includes transmitting and receiving means for transmitting and receiving data, such as an RF transceiver 160', 80', connected thereto (see FIG. 6).

The data communication apparatus 150 preferably has a housing 151 or 200, and transmitting and receiving means positioned within the housing for transmitting and receiving data from the portable data reader 20. A central processor 180 is positioned in electrical communication with the transceiver 160 and is adapted for processing data received from the portable data reader 20. A memory circuit 185 adapted for storage of data and a power source 170 is also electrically connected to the central processor 180.

The portable data reader 20, 20' illustrated in FIGS. 1–7 is preferably a bar code data reader as understood by those skilled in the art and, accordingly, the discussion of preferred illustrated embodiments of the invention will be directed to bar code data readers. It will be understood, however, by those having skill in the art that the invention can be used for a portable data reader 20, 20' which senses and decodes any type of data including bar code, multiple-dimensioned code, and/or other optical data codes.

More specifically, first and second embodiments of a portable data reader 20, 20' are illustrated having prime (') notation designating like elements between the two embodiments in FIGS. 1A–2B. In order to reduce repetitiveness, only the major differences between the two embodiments will be discussed with reference to the second embodiment. FIGS. 1A, 2A, and 3A illustrate a portable bar code data reader 20 having a housing 21 which includes a front surface 22, a back surface, a first distal end 24 and a second proximal end 25, and upper and lower ends 26, 27.

A data sensor 30 is connected to the housing 21 and has portions thereof positioned within the housing 21 (see FIG. 3A). The data sensor 30 is preferably an optical data sensor having a sensor tip 31 connected to the first proximal end 25 of the housing 21. The data sensor 30 is preferably a light emitting diode optical sensor, including an optical emitter and an optical detector. The data sensor 30 is also preferably adapted for sensing bar code data and such sensors are available from Hewlett-Packard Corp. of San Jose, Calif. (i.e., HEDS-3000 or HEDS 3050).

As will be understood by those skilled in the art, the data sensor 30 preferably makes use of a light driver, a light source—such as an LED emitter, an optics package, and a light detector (i.e., photodiode). When the light source is energized,. preferably in a pulsed fashion, the optics package, which might include a gradient index lens, focuses a beam of light on a bar code to be sensed. The light detector then detects the light which is reflected back to the bar code data reader 20 through the optics package and produces an electrical signal output therefrom that is proportional to the reflected light. A light detector interface receives the electrical signal output from the light detector and transforms the electrical signal output to an analog signal is proportional to the reflected light. Data sensors 30 are understood by those skilled in the art and therefore will not be described further herein. An example of a low power data sensor 30 may be seen in U.S. Pat. No. 5,281,800 titled "*Method and Apparatus for Low Power Optical Sensing and Decoding*" by Pelton et al. and is assigned to the assignee of the present invention. This patent is also hereby incorporated herein by reference.

An analog-to-digital ("A/D") converter 35 electrically connected to the sensor 30 receives the analog signal from the data sensor 30 and converts the signal from analog to digital format. The A/D converter 35 is preferably an electrical hardware configuration of discrete components, but as understood by those skilled in the art the A/D converter may be an integrated circuit and/or software implementation.

A display 40 is also connected to the housing 21 and numerically and graphically displays data to a user of the reader 20. As understood by those skilled in the art, the display 40 is preferably a liquid crystal display having a plurality of rows and columns of data viewable to a user such as illustrated in FIGS. 1A and 1B, and preferably includes drive circuitry for the same.

A user interface 50 is connected to the housing 21 of the data reader 20 and is positioned adjacent the display. The user interface preferably includes a keyboard 50 and a user interface switch 58 both of which are responsive to interaction with a user. The user interface switch 58 is connected to an upper end 26 of the housing 21 (see FIG. 1A) and is engaged by a user to initiate communication to the portable data reader 20.

First transmitting and receiving means illustrated in the form of an input/output ("I/O") source 80, such as a transceiver and an RS-232 interface communication link, is connected to the housing 21, has portions positioned therein, and is positioned in electrical communication with the central processor 60 for transmitting data from and receiving data to the portable data reader 20. The I/O source 80 may also be an optical emitter or the like that optically transmits data to an optical detector position in the data communication apparatus 150.

A timer, illustrated as clock 75, is also positioned within the housing 21 to provide timing signals for the data reader 20. As understood by those skilled in the art, the timer 75 is preferably a 32 kilohertz (kHz) crystal oscillator which supplies a timing signal to other elements of the data reader 20, such as a central processing unit ("CPU").

The portable data reader 20 further preferably has illumination means, such as a backlighting circuit, positioned within the housing 21 and adjacent the display 40 for illuminating the display 40 responsive to low ambient environmental conditions surrounding the portable data reader 20. The data reader 20 also has a sound source 95 positioned within the housing 21 to supply a predetermined sound, i.e., beep or tone, responsive to the user.

Additionally, the portable data reader 20 includes a portable power source 70 positioned within the first housing 21. The portable power source 70, i.e., battery or batteries, is preferably positioned in electrical communication with the data sensor 30, the display 40, the illumination means illustrated in the form of backlighting 45, the sound source 85, the user interface 50, the transmitting and receiving means 80, and the timer 75. The portable power source 70 is adapted to supply power to these various elements of the data reader 20. The portable power source 70 preferably includes a main 9-volt battery 73 and a reserve, i.e., lithium, 6-volt battery 72. The reserve battery 72 is only used during the duration that the main battery 73 is removed from the data reader 20 for replacement or recharging thereof.

The portable data reader 20 further has a power source sensor 90 positioned within the housing 21 of the data reader 20 and in electrical communication with the portable power source 70. The power source sensor 90 is adapted to sense the amount of power stored in the portable power source 70.

As best illustrated in FIGS. 3A–5, the portable data reader 20 preferably includes a power manager 100 positioned within the housing 21 and in electrical communication with the portable power source 70, the data sensor 30, the display 40, the user interface 50, the transmitting and receiving means 80, the illumination means 45, the sound source 95, and the timer 75. The power manager is particularly adapted to manage the amount of and timing of power supplied to the data sensor 30, the display 40, the user interface 50, the illumination means 45, the sound source 95, and the transmitting and receiving means responsive to timing signals from the timer 75 and interaction of a user with the user interface 50 to thereby substantially extend the time period required before replacing or recharging the portable power source 70.

Figure 3B:
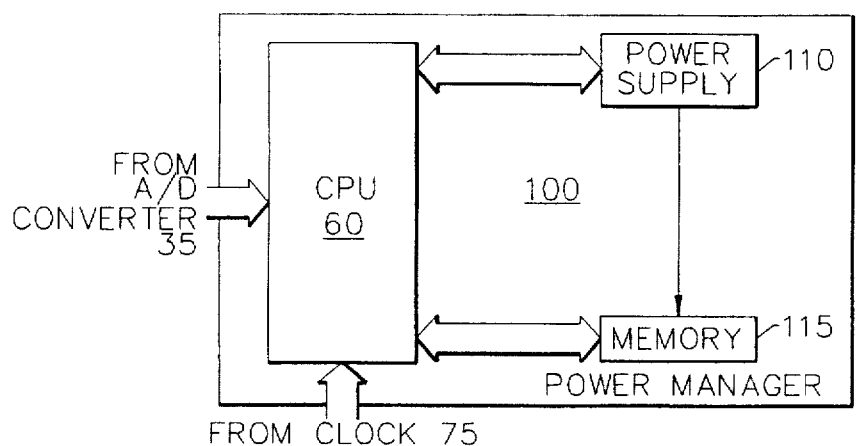
FIG. 3B schematically illustrates a power manager of a portable data reader according to a first or second embodiment of the present invention.
Figure 6:
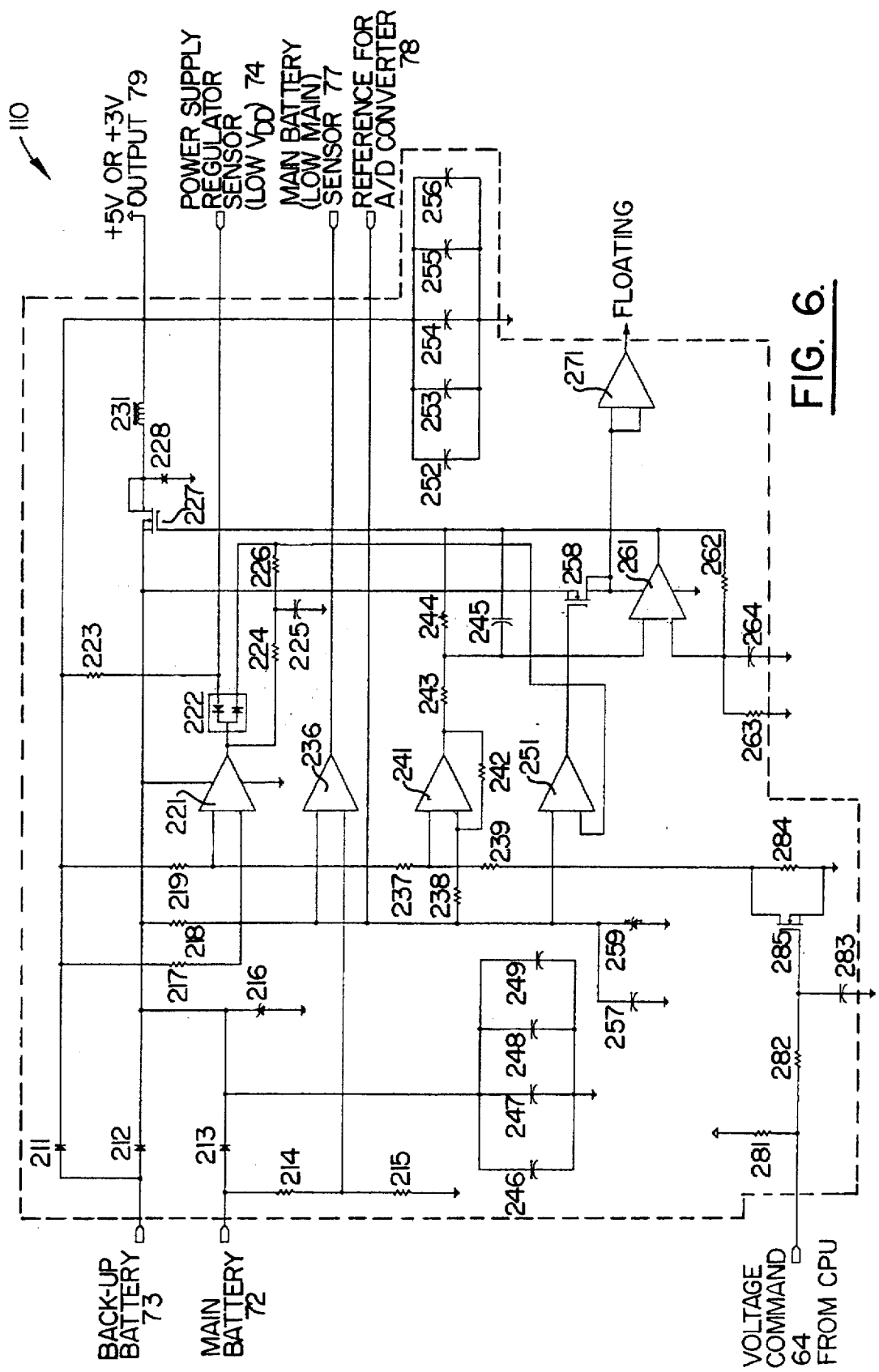
FIG. 6 schematically illustrates a power supply circuit for a power manager of a portable data reader according to a first or second embodiment of the present invention.

As best shown in FIGS. 3A–3B and 6, the power manager 100 of the portable data reader 20 preferably has a central processor 60, a power supply circuit 110, and a memory circuit 115 positioned within the housing 21 and in electrical communication with the data sensor 30, including an electrical connection to the A/D converter 35 (see FIG. 3A), the display the user interface 50, the clock 75, the illumination means 45, the sound source 95, the portable power source 70, the power sensor 90, and the transmitting and receiving means 80. The central processor 60 processes and decodes the sensed data received from the A/D converter 35, processes various other data from the other elements of the reader 20 in electrical communication therewith, i.e., data received via the input/output source 80 from the data communication apparatus 150. The central processor is preferably a microprocessor capable of a high speed, i.e., 32 MHz, and a high data level, of processing, such as microprocessors supplied from Motorola Corporation, Intel Corporation, or other suppliers known to those skilled in the art.

The power supply circuit 110 is preferably electrically connected to and responsive to predetermined commands from the central processor 60. As further described in FIG. 6 below, the power supply circuit 110 is preferably a switching power supply circuit that switches between about 5 volts output and 3 volts output and is also preferably electrically connected to the memory circuit 115 to supply power thereto. The memory circuit 115 is preferably a Flash memory integrated circuit as understood by those skilled in the art and is positioned in electrical communication with the central processor 60. The memory circuit 115 preferably has source code software commands and operations, as understood by those skilled in the art, stored therein responsive to predetermined commands from the central processor 60 as further described with reference to FIGS. 4 and 5A–5C herein below.

Figure 4:
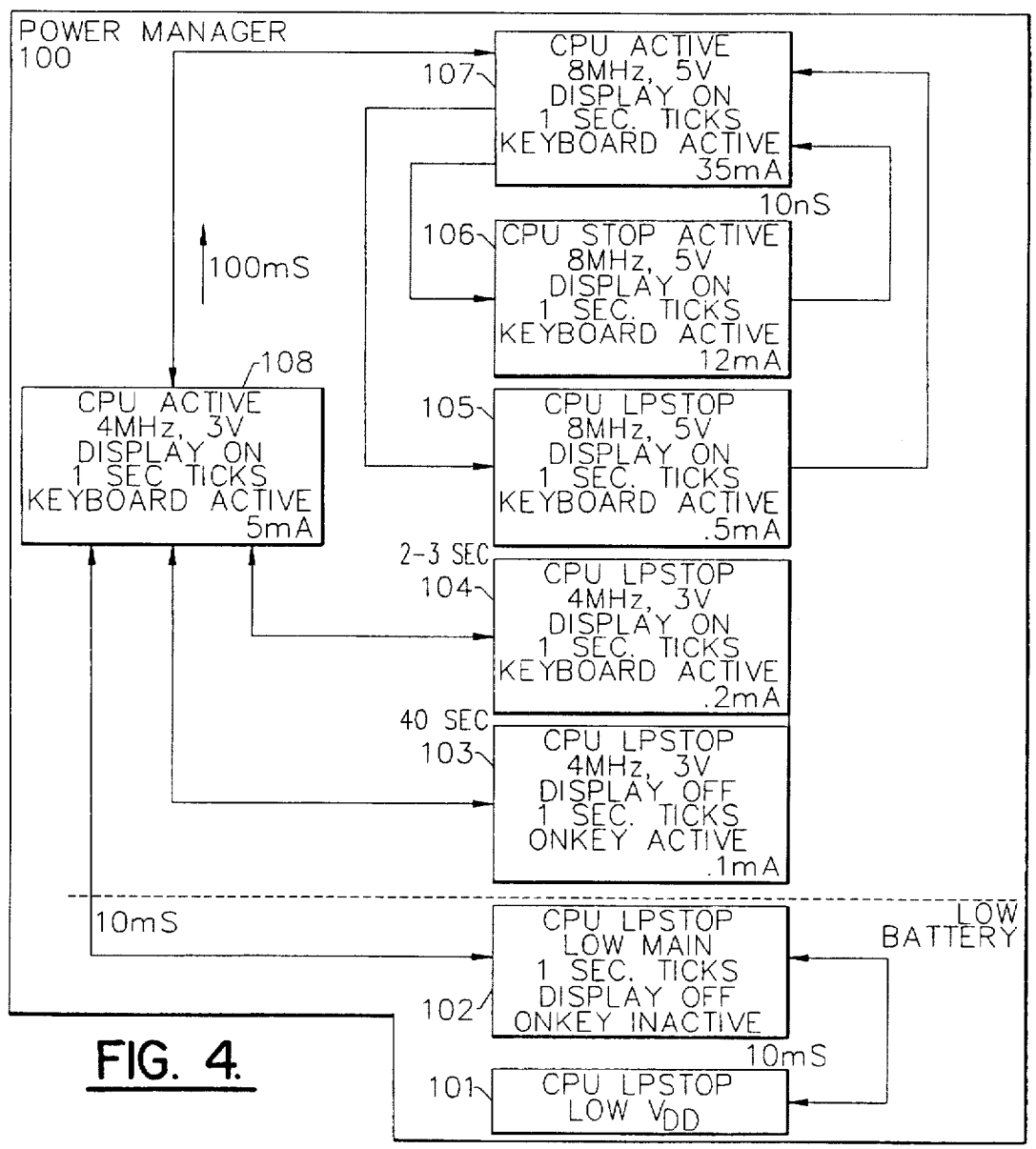
FIG. 4 schematically illustrates various power modes and power levels of operation for a power manager of a portable data reader according to the present invention.

FIG. 4 schematically illustrates the various power modes and power levels of operation of a portable data reader 20 having a power manager 100 according to the present invention. The power manager 100 preferably includes at least four main modes of predetermined power operation of the central processor 60, the display 40, and the user interface 50. This schematic illustration also illustrates the various operation speeds of the central processor 60, i.e., 4 MHz, 8 MHz, and 1 second ticks from a real time clock of the central processor 60. The first power mode (see blocks 101–102) has the central processor 60 inactive, the display 40 in an off-state, and the user interface 50 inactive. The second power mode (see block 103) has the central processor 60 inactive, the display 40 in an off-state, and the user interface 50 active. The third power mode (see block 104, 105) has the central processor 60 inactive, the display 40 in an on-state, and the user interface 50 active. The fourth power mode (see blocks 106, 107, 108) has the central processor 60 active, the display 40 in an on-state, and the user interface 50 active. The shifting between the various power levels and power modes in the power manager 100 is preferably transparent to a user of the portable data reader 20, except for the on and off states of the display 40.

The first power mode (101–102) of operation has at least two different predetermined levels of power being supplied to the central processor 60, the display 40, and the user interface 50 responsive to the power manager 100 and the power source sensor 90 positioned in electrical communication therewith. A first predetermined level 102 is responsive to the power source sensor 90 and supplies an amount of power less than the second power mode and responsively indicates to a user that a relatively low predetermined amount of power remains stored in the portable power source 70. A second predetermined level 101 is responsive to the power source sensor 90 and supplies an amount of power even less than the first level to ensure that critical data function remains in storage even when the battery source 70 is very low.

The second power mode (103) of operation has the central processor 60 inactive, the display 40 off, and the user interface 50 active. The active state of the user interface 50 in this power mode preferably includes only the on-key which is responsive to user input at this level of power. This second power mode 103 is the preferred state of operation of the portable data reader 20' when the portable power source 70 is not low. At this level, preferably only about 0.1 milliamperes (mA) of current is supplied to the portable data reader 20 from the portable power source 70 and the reader 20 essentially appears to be asleep or in an off-state.

The third power mode (104, 105) has at least two predetermined levels of power being supplied to the central processor 60, the display 40, and the user interface 50, and at least one level 104, preferably only about 0.2 mA of current, supplying an amount of power less than the other predetermined level 105, preferably about 0.5 mA. These power levels in this mode operate from two different voltage levels, namely about 3 volts at the lower power level (104) and about 5 volts at the upper power level (105). The clocking frequencies are likewise at two different frequencies, namely about 4 MHz at the lower power level (104) and about 8 MHz at the upper power level (105).

The fourth power mode (106–108) of operation has the central processor 60 active, the display 40 on, and the user interface 50 active. It has at least two, and preferably three illustrated (see FIG. 4), predetermined levels of power being supplied to the central processor 60, the display 40, and the user interface 50 for various uses of the central processor 60 during operational activities, and at least one level 108, preferably only about 5 mA of current, supplying an amount of power less than the other predetermined level 107, preferably about 35 mA. The at least two predetermined levels of power preferably also operate from two different voltage levels, namely about 3 volts at the lower power level (108) and about 5 volts at the upper power level (107). The clocking frequencies are likewise at two different frequencies, namely about 4 MHz at the lower power level (108) and about 8 MHz at the upper power level (107). This fourth power mode, however, also preferably has a third predetermined power level 106 in which the central processor 60 is active, but stopped between processing functions. This level may also be viewed as fifth power mode (106), but since the central processor 60 is active it will be described as a third predetermined level in the fourth power mode. At this third level 106, only about 12 mA of current is supplied to the portable data reader 20 from the portable data source 70 further saving power from the level 107 when the central processor is fully active, i.e., about 35 mA of current.

Figure 5A:
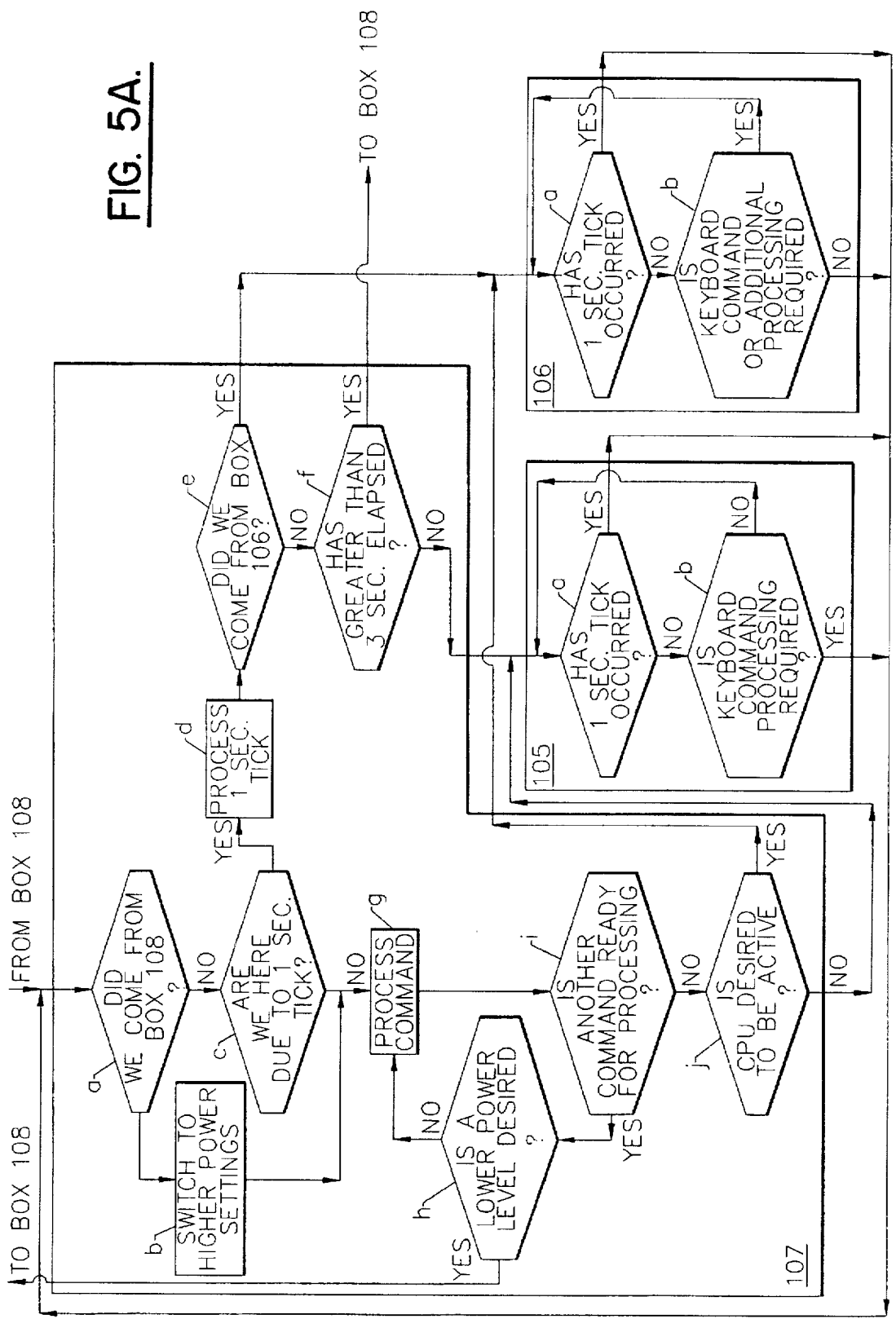
FIGS. 5A–5C schematically illustrate a flow chart of the decisional levels of the power manager of a portable data reader according to the present invention.
Figure 5B:
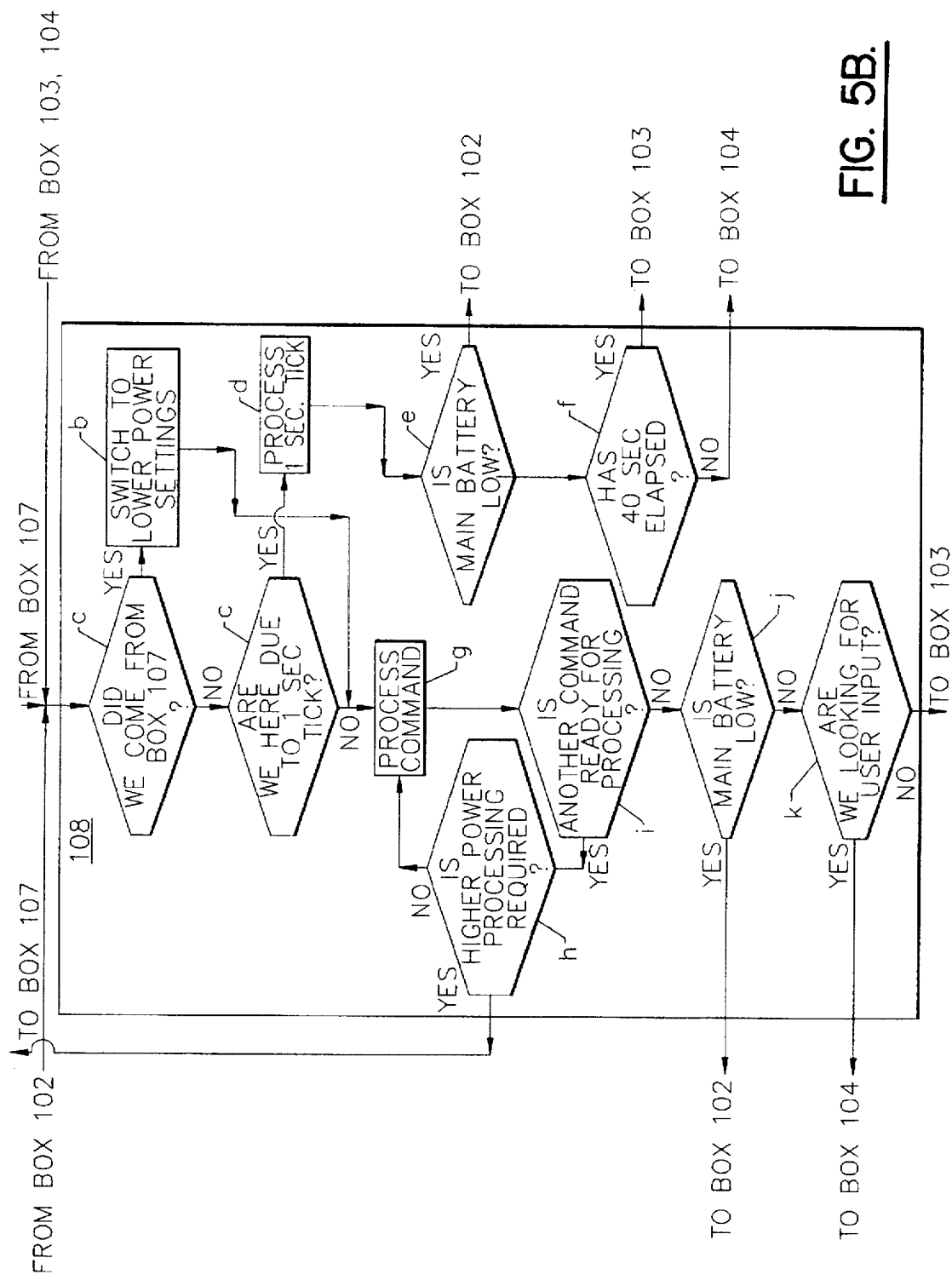
Figure 5C:
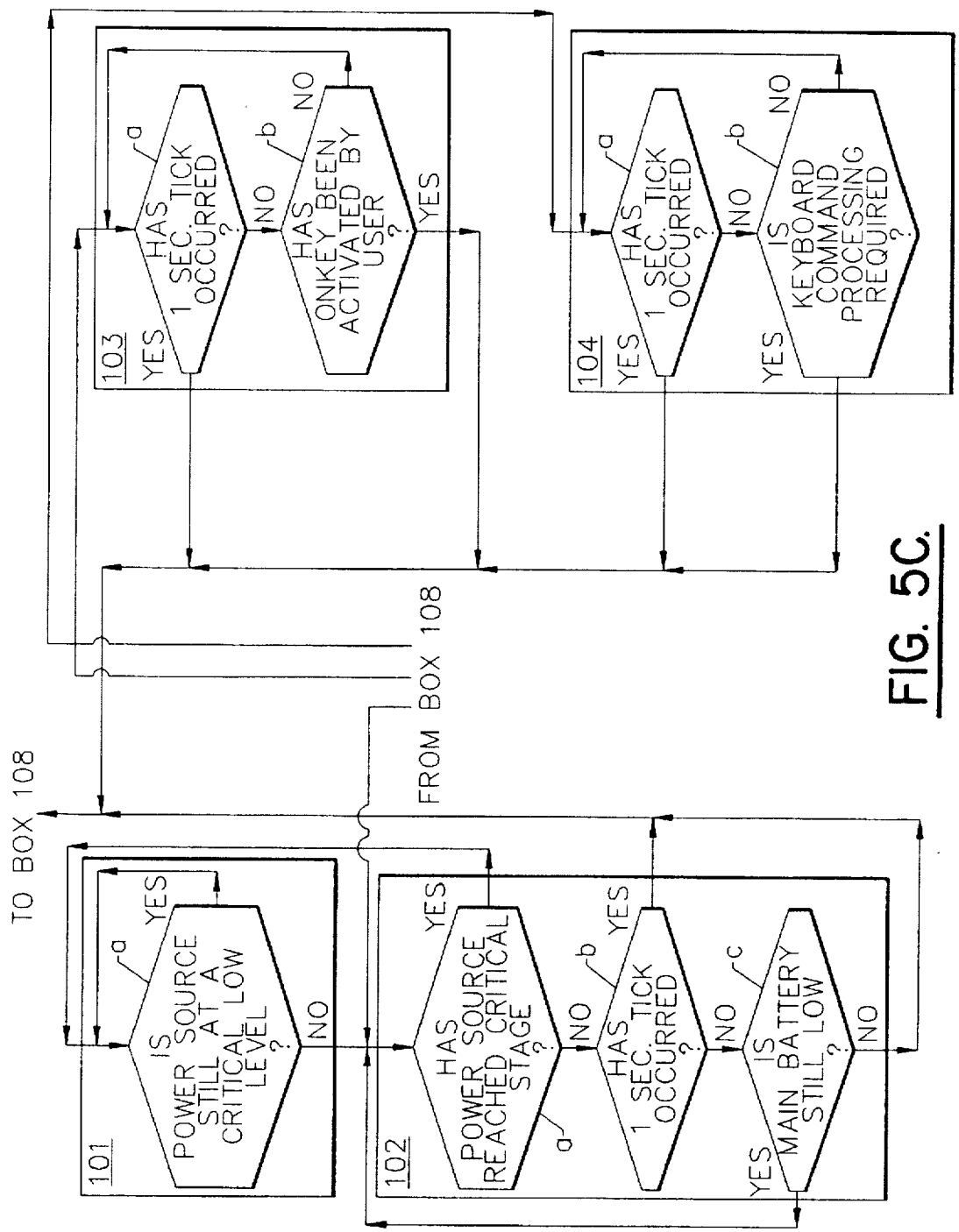

FIGS. 5A–5C schematically illustrate a flow chart of predetermined decisional levels for managing power within the power manager 100 of a portable data reader 20 according to the present invention. These predetermined decisional levels are illustrated with reference to the power levels described in FIG. 4, namely blocks 101–108, and the implementation of the power management levels is a combination of hardware and software as described herein and as understood by those skilled in the art.

FIG. 5A illustrates portions of the third and fourth power modes of operation, and more particularly predetermined levels at blocks 105, 106, and 107. Upon entry into the highest power state of operation, i.e., 8 MHz, 35 mA, 5 volts, the location of where the previous stage of operation is determined as illustrated in block 108a to see if the power manager needs to be at a higher power level. The entry into block 107 preferably can come only from blocks 105, 106, and 108. If entry into block 107 came from block 108, then the power level is switched to the higher level (block 107b) and the command is processed (block 107d). If the entry into block 107 came as a result of a 1 second timing signal, i.e., tick (block 107c) received from blocks 105 or 106, then the 1 second tick is processed (block 107e). If the command came from block 106 (block 107f), then the power management level shifts to block 106 with the central processor 60 active, but temporarily stopped for a predetermine period of time to save power. If, however, the command did not come from block 106 and a predetermined time period, i.e., about 3 seconds of time, has elapsed (block, 107f), then the power management level shifts to block 108 and the lower power setting (see FIG. 5B). If 3 seconds of time has not elapsed, then the power management level returns to block 105 as illustrated.

Additionally, referring back to block 107c, if the entry into this power level of block 107 is not due to the 1 second tick, then the command is processed (block 107g). If another command is ready for processing (block 107i), then a determination of the power level desired to process that command is determined (block 107h). If a lower power level is desired, then the power management level shifts to the lower power level of block 108. Otherwise, the next command is processed (block 107g). On the other hand, lock if another command is not ready, then a determination is made as whether to maintain the central processor 60 in an active state (block 107j). If the central processor 60 is to remain active but stopped, then the power management level shifts to block 106. If the central processor 60 does not need to be active, then the power management level shifts to block 105 as illustrated.

FIG. 5B illustrates the power management level of block 108 which preferably operates at about 3 volts, about 4 MHz, and about 5 mA. Entry into this level preferably comes only from blocks 102-104 and 107. If entry into this level came from block 107 (block 108a), then the switch is made from the higher power setting to the lower power setting (block 108b) and the command is processed (block 108d). If entry into this level, however, is due to the 1 second tick (block 108c), then the 1 second tick is processed (block 108d). At this stage, a determination is made as to whether the main battery of the portable power source 70 is low (block 108e) and, if so, the power management level shift to block 102 (see FIG. 5C). If not, then a determination is made as to whether a predetermined time period, i.e., about 40 seconds, has elapsed (block 108g).

If the entry into the power level of block 108 did not occur due to the 1 second tick, i.e., timing signal, then the command is process (block 108g). If another command is ready for processing (block 108i), then a determination is made as to whether a higher power processing level is required (block 108h). If a higher power is required, then the power management level shifts to block 107. Otherwise, as illustrated, the command is processed (block 108g) If another command is not ready for processing, then a determination is made as to whether the main battery is low (block 108j) If the main battery is low, the power management level shifts to block 102 (see FIG. 5C). If not, then a determination is made as to whether the reader 20 is looking for user input through the keyboard (block 108k). If user input is not requested or needed, then the power management level shifts to block 103; otherwise, the power management level shifts to block 104.

FIG. 5C illustrates the power management levels of blocks 101-104 of the power manager 100. Entry into the power management levels of blocks 102-104 preferably only can come from block 108, and entry into the power management level of block 101 preferably can only occur from block 102 as illustrated. In block 104, a determination is made as to whether a timing signal has occurred or a predetermined amount of time has elapsed, i.e., 1 second tick, (block 104a). If the 1 second tick has occurred, then the power management level shifts to block 108. Otherwise, a determination is made as to whether a keyboard command has been received and required to be processed (block 104b). If a keyboard command is required to be processed, then the power management level shift to block 108 for processing the command. If not, then the power management level remains in block 104 and the process is repeated as illustrated.

In block 103 of FIG. 5C, a determination is also made as to whether a timing signal has occurred or a predetermined amount of time has elapsed, i.e., 1 second tick, (block 103a). If the 1 second tick has occurred, then the power management level shifts to block 108. Otherwise, a determination is made as to whether the onkey has been activated by the user (block 103b). If activation has occurred, then the power management level shift to block 108 for processing a command. If not, then the power management level remains in block 103 and the process is repeated as illustrated.

Blocks 101 and 102 further illustrate the first main power mode of the portable data reader 20. Entry into the power management level of block 102 preferably only occurs from block 108 and a determination is made as to whether the power source has reached a critically low stage or state (block 102a), i.e., low $V_{DD}$ state. If the power source 70 has not reached a critically low state, then a determination is made as to whether a 1 second tick has occurred (block 102b). If the 1 second tick has occurred, then the power management level shifts to block 108. Otherwise, a determination is made as to whether the main battery of the power source 70 is still low (block 102c). If the main battery is no longer low, then the power management levels shifts to block 108. If the main battery is still low, then the process of block 102 is repeated. If, however, the power source 70 has reached a critically low state, i.e., low $V_{DD}$, then the power management level shifts to block 101. The power manager 100 maintains the operation of the portable data reader 20 at this level until the power source 70 is not longer at the critical level (block 101a). If the power source 70 is no longer critical, i.e., batteries replaced or recharged, then the power management level shifts to block 102 as illustrated.

FIG. 6 schematically illustrates a preferred embodiment of a power supply circuit 110 for a power manager 100 of a portable data reader 120 according to a first or second embodiment of the present invention. As illustrated, the power supply circuit 110 is preferably a switching power supply circuit that switches the voltage output 79 between about 5 volts and about 3 volts responsive to predetermined command signals received from the central processor 60 electrically connected thereto at 64. As understood by those skilled in the art, the plurality of resistors 214-215, 217-219, 223-224, 226, 237-239, 242-244, 262-263, 281-282, 284, diodes 211-213, 216, 228, 259, capacitors 225, 245-249, 252-257, 264, 283, operational amplifiers 221, 236, 241, 251, 261, 271, transistors 227, 258, 285, a half-bridge diode network 222 and a split choke 231 of this electrical network configuration as illustrated provide the power sensing capabilities of the power sensor 90 and the power supply capabilities of the power manager 100.

The portion of the circuit 110 connected to a back-up battery 73, a main battery 72, a power supply regulator sensor (low $V_{DD}$) 74, and a main battery sensor 77, including the pair of operational amplifiers 221, 236, the half-bridge 222, the capacitors 225, 246-249, the resistors 214-215, 217-219, 224, 226, and the diodes 211-213, 216, is primarily directed to determining the amount of power being supplied from the power source 70 and switching between the back-up battery 73, the main battery 72, the low main battery 77, and the low $V_{DD}$ 74 states. A reference 78 provides calibration for an A/D converter of the data reader 20. The remaining portion of the circuit 110 is primarily directed to switching between about 5 volts of power being supplied to the output 79, i.e., then to the other elements of the data reader 20, and about 3 volts of power being supplied to the output 79, i.e., then to other elements of the data reader 20. As understood by those skilled in the art, the values of the resistors and capacitors of the power supply circuit 110 and the other operational characteristics may vary or be experimentally determined depending on the power source 70, the power levels, the other elements of the reader 20, and other parameters of the application of the data reader 20. It will also be understood that some of these elements may be stored in a software program for implementation responsive to predetermined commands from or within a microprocessor.

Figure 7:
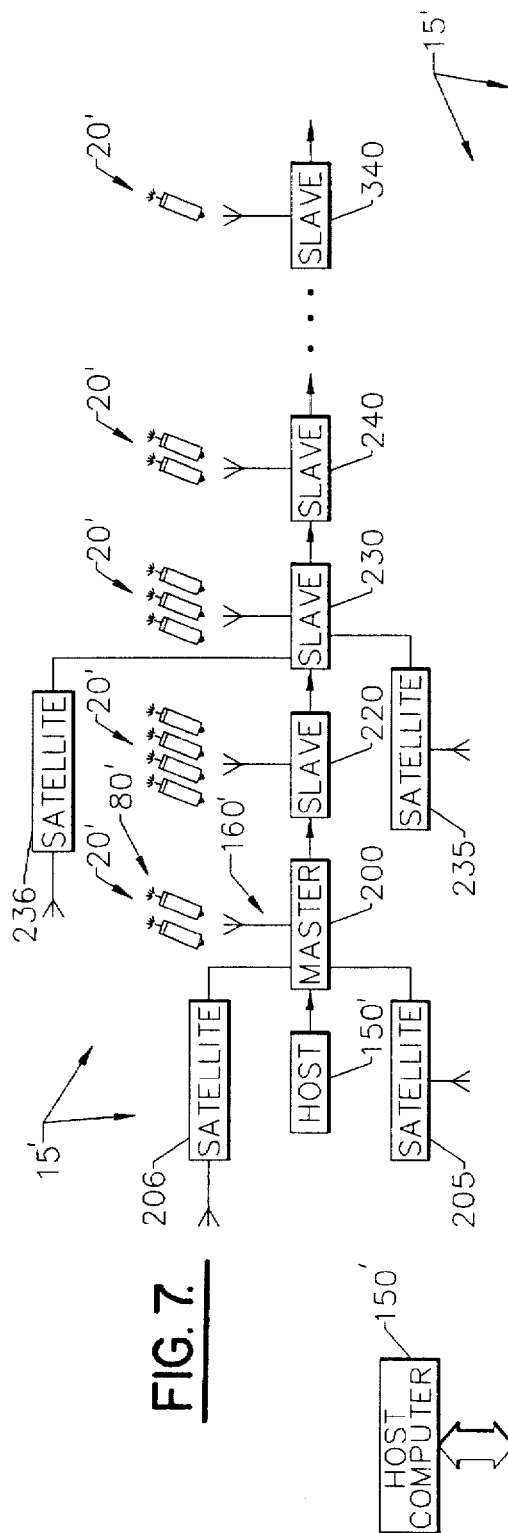
FIG. 7 schematically illustrates a data recognition apparatus including a plurality of portable data readers according to a second embodiment of the present invention.

As best illustrated in FIGS. 1B, 2B, 7 and 8, the apparatus 15' according to a second embodiment of the invention also has an RF portable data reader 20' that communicates with an RF data communication apparatus 150'. This embodiment preferably has a plurality of communication stations that communicate with a plurality of portable data readers 20' in a network configuration as illustrated in FIG. 7. The host computer 150' may be any type of computer or device capable of communicating via an RS-232 or RS-485 asynchronous link. A single master communication station 200, a plurality of slave communication stations 220, 230, 240, 340, and a plurality of satellite stations 205–206, 225–226 are preferably RF communication stations. The one master station 200 may be connected to as many as 255 slave stations. The master station 200 and the host computer 150' communicate via the RS-232 or RS-485 link. The master station's 200 communication link with the host computer 150 is preferably separate from the other slave station 220, 230, 240, 340 communication conflict with the conflict with the slave station-to-slave station communications. Communication speed and protocol may also be separately determined by the application of the data recognition apparatus 15. The master station 200 and the slave stations 220, 230, 240, 340 preferably have a daisy-chain configuration via a four wire, i.e., two pair, RS-485 port. The host computer's 150 main functions are to provide a database, to process data received from the master station 200, and to control communication on the RS-485 network.

The slave station's 220, 230, 240, 340 function, on the other hand, is to provide a cell for RF coverage to a particular work area or the like. The slave stations 220, 230, 240, 340 preferably are programmed in C-language or UDL-language in a stored program in software. These programs preferably use the same development system as the portable data readers 20' and are uploaded via the RS-232 or RS-485 communication ports. Each slave 220, 230, 240, 340 preferably has a unique one byte identifying number which is assign by the master station 200 when the slave station 220, 230, 240, 340 initiates communication.

In operation, the master station 200 will continuously poll the slave stations 220, 230, 240, 340 by sending the identifying number to the slave stations 220, 230, 240, 340 on the network. Each identifying number transmitted by the master station 200 preferably will be in the form of a complete data packet. If the slave stations 220, 230, 240, 340 desires to send a data packet to the master station 200, it will wait for its identifying number to be transmitted. At that point it will take control of the transmitting line and send the data packet. Communications between the master station 200 and the slave stations 220, 230, 240, 340 will continue normally until all required transactions are concluded, at which point the slave station 220, 230, 240, 340 will drop the transmitting line it occupies and the master station 200 will resume polling. If the master station 200 initiates a transaction with a particular slave station 220, 230, 240, 340, it will preferably preface the first data packet with the slave station's identifying number. The slave station 220, 230, 240, 340 will then take control of the transmitting line. Switches are also preferably provided within the master station 200 and the slave stations 220, 230, 240, 340 to allow termination of the RS-485 line.

Figure 8:
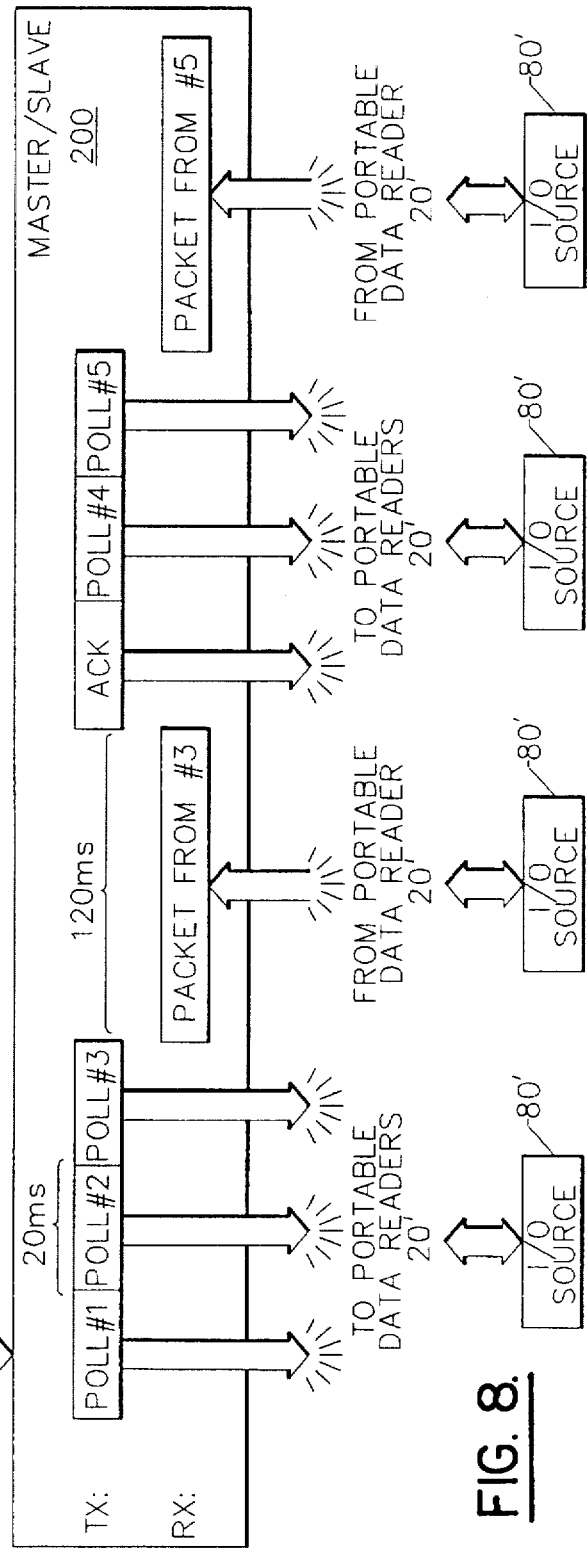
FIG. 8 schematically illustrates input/output source polling of a data recognition apparatus including a plurality of portable data readers according to a second embodiment of the present invention.

In this embodiment, the portable data reader 20' preferably has the first transmitting and receiving means 80' which includes polling means responsive to the power manager 100 and the second transmitting and receiving means 160' for polling the second transmitting and receiving means 160' and determining whether other data from a second portable data reader 20' is being transmitted thereto (see FIG. 8). In operation, all master 200 and slave 220, 230, 240, 340 stations preferably will be continuously polling the portable data readers 20' for data transmissions therefrom. Data is preferably transferred using an asynchronous format at 4800 bits per second ("bps") or 9600 baud. When a packet is received from a portable data reader 20', this data will be sent to the master station 200 along with the strength of the transmission signal. If a plurality of communication stations receive the same packet, the master station 200 preferably will use the signal strength to determined which base first responds. If the first station, i.e., slave station 220 is unable to get a response back from the portable data reader 20' that sent the data packet, then the next station, i.e., slave station 240, that received the packet will try, and so on. If one of the slave stations 220, 230, 240, 340 needs to initiate communications, then the master station 200 will decide which slave station 220, 230, 240, 340 will transmit first based on previous communications with the portable data reader 20'.

To prevent contention, preferably only one slave station 220, 230, 240, 340 at a time will transmit. A slave station 220, 230, 240, 340 preferably will only transmit when directed to do so by the master station 200. In addition, all slave stations 220, 230, 240, 340 preferably will use a listen-before-transmit protocol to prevent interrupting a portable data reader 20' transmission. There may be some circumstance where two or more slave stations 220, 230, 240, 340 may transmit at the same time to improve efficiency. As understood by those skilled in the art, this also may be incorporated into the communication protocol.

The protocol for the data communication apparatus 15' is preferably an inquiry based slotted response scheme. A plurality of data readers 20' are preferably polled at one time and provided with a common time slot for response. The number of slots and the delay times for each slot may be determined depending on the application of the user.

To reduce the occurrence of two or more data readers 20' transmitting at the same time, each data reader 20' is also preferably assigned an identifying number when it initiates communication. When there is no traffic on the RF network, each master 200 or slave station 220, 230, 240, 340 will continuously poll for each data reader 20' by transmitting an 8 millisecond (ms) 14,000 Hz tone, followed by a short data word consisting of the identifying number of the data reader 20' being polled and several status bits, all of which preferably occupies about 2.5 ms of time.

The master 200 or slave station 220, 230, 240, 340 will then listen for 10 ms to receive a reply message from the data reader 20'. The portable data readers 20' will listen for this specific tone and their identifying number prior to any transmission. Following a transmission, the data reader 20' will listen for an acknowledgment or non-acknowledgment from the host computer 150. If neither is received, the data reader 20' will wait to be polled again before reattempting the communication. Acknowledgment preferably occurs between the portable data reader 20' and the master 200 or slave station 220, 230, 240, 340 to verify communication therewith.

The identifying number byte preferably has eight (8) bits of data, and four (4) bits of forward error correction. The first three bits of data preferably contain information on pending messages for the portable data readers 20'. The East five bits of data preferably contain the identifying number. Each polling packet sent by the master 200 or slave station 220, 230, 240, 340 preferably requires about 21 ms of time if no response is heard, i.e., 8 ms of tone, 2.5 ms of data, and 10 ms of waiting for a reply to start. A maximum of 32 discrete identifying numbers, i.e., 0–31, will be polled. This will take about 672 ms to poll the entire list if no answers occur. If more than 32 portable data readers 20' are communicating in the network, then the readers 20' will respond based on the low five (5) bits of their identifying number. This may lead to the possibility of a collision.

When a data reader 20' with an identifying number greater than or equal to 32 fails to receive an acknowledgement or non-acknowledgment, it will skip identifying number 32 of its poll packets before reattempting the communication. For example, data reader numbers 2, 34, and 66 all attempt to transmit a packet when identifying number 2 is polled. The master 200 or slave station 220, 230, 240, 340 does not see valid data and so does not reply, but continues polling. Data reader number 2 will transmit at the second identifying number, and data reader number 66 at the third.

As understood by those skilled in the art, the portable data reader 20' and the master 200 and slave stations 220, 230, 240, 340 preferably use Manchester encoding for all transmissions. Each transmission is preferably preceded by a synchronous pattern to establish timing, i.e., to both clear the transceiver 80' of the portable data reader 20' and maintain a zero voltage DC at the internal receiver comparison circuitry. The master 200 or slave station 220, 230, 240, 340 preferably will hold the information, reformatting it as necessary, and communicate with the host computer 150 according to the host wire line protocol.

Figure 9A:
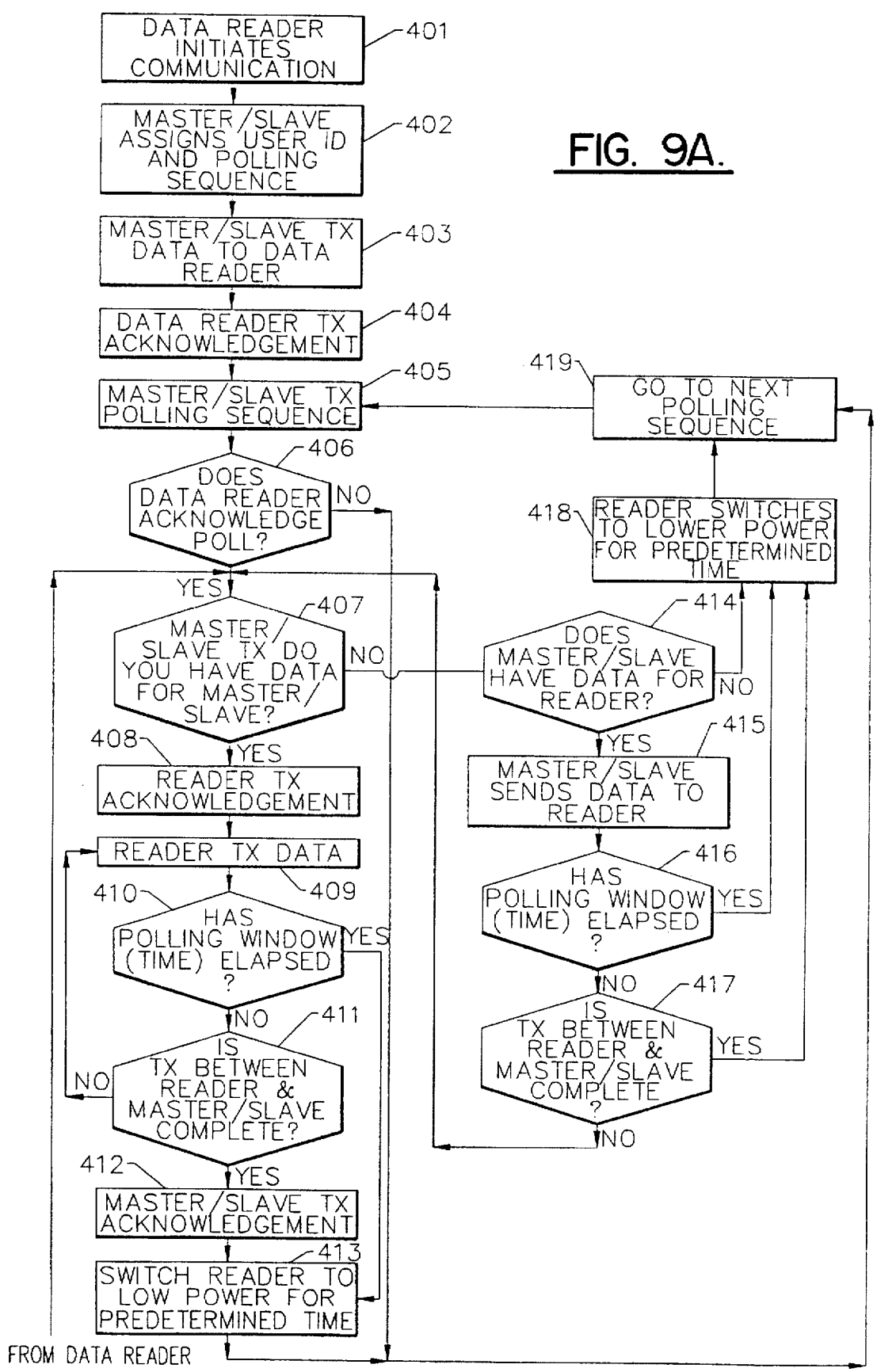
FIGS. 9A–9B schematically illustrate a flow chart of a communication and polling sequence of a data recognition apparatus, including a portable data reader, according to a second embodiment of the present invention.
Figure 9B:
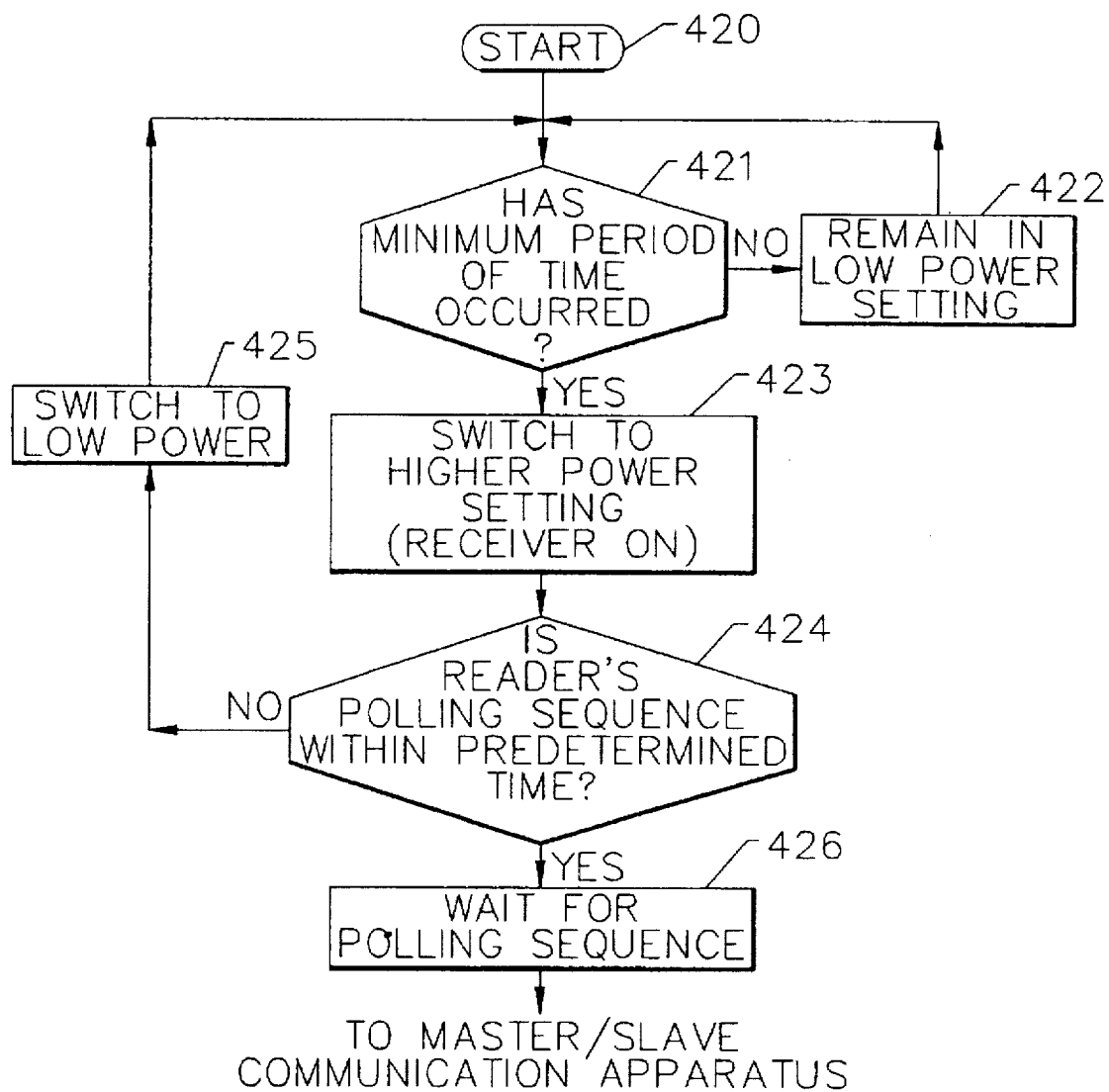

FIGS. 9A–9B schematically illustrate a flow chart of a communication and polling sequence of a data recognition apparatus, including a portable data reader, according to a second embodiment of the present invention. As understood by those skilled in the art, this operational communication sequence is preferably implemented in a combination of hardware and software positioned in and connected to the data reader 20' and the data communication apparatus 150 which preferably includes the master station 200, the satellite stations 205, 206, 225, 226, and the slave stations 220, 230, 240, 340.

As illustrated in FIGS. 8–9B, the data reader 20' initiates communication, i.e., logs onto the network, with the data communication apparatus 150', i.e., master station 200 (block 401). The master station 200 assigns a user identifying number as described above and polling sequence to the reader 20' (block 402). The master station 200 transmits this assignment data to the reader 20' (block 403), and the reader acknowledges receipt of this data (block 404). The master station 200 then initiates or includes the reader 20' in an existing polling sequence transmitted to the plurality of readers 20' (block 406) which preferably last no longer than about 20 ms. If the data reader 20' fails to acknowledge the polling thereof (block 406), then the next reader 20' in the polling sequence is polled (block 419). If the reader 20' acknowledges the polling but does not have data for the master station 200 (block 407), then the reader 20' determines whether the master station 200 has data for the reader 20' (block 414).

If the master station does not have data for the reader, then the reader switches to lower power for a predetermined time (block 418). This lower power mode preferably includes switching the transceiver 80' to an off-state wherein relatively no current is supplied thereto, from a transmitting and receiving state where a current of about 12–20 mA is supplied thereto depending on the transmitting or receiving states (see FIG. 9B). If the master station 200 dogs have data for the reader, then the master station sends the data (block 415), and a determination is made whether the polling window, i.e., a time of about 120 ms, has elapsed (block 416). If the polling window has elapsed, then the reader switches to the lower power state (block 418) and waits for the next sequence. If this window has not elapses and the transmission from the master, station is completed (block 417) then the lower power state is entered.

If the reader 20' does have data for the master station 200, then the reader acknowledges (block 408) and transmits the data thereto via the RF link (block 409). A determination is made whether the polling window has elapsed, i.e., preferably a time of about 120 ms (block 410), and if so, the reader switches to lower power (block 413), the master station 200 polls the next reader (block 419), and the previous reader waits until the next polling sequence to transmit additional data. If the window has not elapsed, then completion of the data transmission is determined (block 411), the master station 200 acknowledges the completed transmission ' (block 412), and the reader then switches to the lower power (block 413).

During a next polling sequence for the same reader 20', as shown by the data reader entering the flow diagram between blocks 406 and 407, the reader switches to a higher power setting to listen for the poll. As illustrated in FIG. 9B, the reader 20' may make a determination based on the number of readers in the polling sequence and a predetermined time of each poll and each data transmission of other readers (blocks 420, 421) and switch to the higher power (block 423) or remain in the lower power state (block 422). If the reader 20' is switched to this higher power state, then from the other parameters of the network, it can determine if its polling sequence is within a predetermined time (block 424). If not, then it switches to the lower power state (block 425) and waits again. If the polling sequence is soon, then it can remain in the higher power state and wait for the polling sequence (block 426) as illustrated Also, according to the present invention, methods of managing power for a portable data reader 20 are provided as described herein and preferably including the data sensor 30, the central processor 60, the display 40, the user interface 50, the timer 75, the portable power source 70, and the power supply circuit 110 (see FIG. 6). A method for managing power for a portable data reader 20 preferably includes supplying power from the portable power source 70 to the power supply circuit 110 electrically connected thereto. The power supply circuit 110 responsively provides electrical signals to the central processor 60, the display 40, and the data sensor 30. A memory circuit 115 is positioned in electrical communication with the power supply circuit 110 and the central processor 60. The central processor 60 transmits command signals to the power supply circuit 110 responsive to commands from the memory circuit 115, the timer 75, and the user interface 50. The power supply circuit 110 then supplies only a predetermined amount of power from the power supply to the central processor 60, the display 40, the user interface 50, and the data sensor 30 responsive to the predetermined command signals supplied to the power supply circuit 110 from the central processor 60.

In the drawings and specification, there have been disclosed typical preferred embodiments of the invention and, although specific terms are employed, they are used in a descriptive sense only and not for purposes of limitation.

The invention has been described in considerable detail with specific reference to these various illustrated embodiments. It will be apparent, however, that various modifications and changes can be made within the spirit and scope of the invention as described in the foregoing specification and as defined in the appended claims.

That which is claimed:

1. A portable data reader comprising:

a data sensor adapted to sense data;

a first central processor in electrical communication with said data sensor, wherein said first central processor is adapted to process and decode the data sensed by said data sensor;

a display in electrical communication with said first central processor and being adapted to display data to a user;

a user interface in electrical communication with said first central processor and being responsive to interaction with a user;

transmitting and receiving means operably associated with said first central processor for transmitting data to and receiving data from a second central processor remote from said portable data reader;

a portable power source in electrical communication with said data sensor, said first central processor, said display, said user interface and said transmitting and receiving means, said portable power source being capable of selectively supplying a plurality of predetermined power levels selectively to at least one of said data sensor, said first central processor, said display, said user interface and said transmitting and receiving means;

a power manager operably associated with said portable power source and transmitting and receiving means for controlling the selective supplying of said plurality of predetermined power levels in response to said user interface and said first central processor, wherein said power manager selectively supplies said plurality of predetermined power levels so as to periodically enable said transmitting and receiving means at predefined intervals to provide prolonged life for said portable data processing system; and wherein said second central processor transmits a poll to said transmitting and receiving means of said portable data reader at said predefined interval, and wherein said power manager selectively enables said transmitting and receiving means at said predefined interval for a predetermined polling window time to determine if a poll is transmitted to said portable data reader from said second central processor and wherein said portable data reader determines said predefined interval by receiving at said transmitting and receiving means an entire polling sequence from said second central processor and then calculating said predefined interval from the number of responses in said entire polling sequence.

2. A portable data reader according to claim 1, wherein said power manager further activates said first central processing unit to process said poll if it is determined that a poll was transmitted to said portable data reader from said second central processor.

3. A method of managing power in a portable data reader having a portable power source capable of storing power and then providing said stored power to said portable data reader and a transmitter and receiver for communication with a data processor remote from said portable data reader, said method further comprising:

selectively supplying power to said transmitter and receiver at predefined intervals; then determining if a poll addressed to said portable data reader is to be received within a predetermined time; and maintaining power to said transmitter and receiver to thereby communicate with said remote data processor if said determining step determines that said poll is to be received by said portable data reader within said predetermined time.

4. A method according to claim 3, wherein said determining step comprises:

monitoring communications between other portable data readers and said remote data processor; and determining from said monitored communications if said poll is to be received by said portable data reader within said predetermined time.

5. A method according to claim 3, said method further comprising the step of:

receiving at said transmitter and receiver an entire polling sequence from said remote data processor and then calculating said predefined interval from the number of responses in said entire polling sequence.

6. A method of managing power in a portable data reader having a portable power source capable of storing power and then providing said stored power to said portable data reader and a transmitter and receiver for communication with a data processor remote from said portable data reader, said method further comprising:

receiving at said transmitter and receiver an entire polling sequence from said remote data processor and then calculating a predefined interval from the number of responses in said entire polling sequence;

selectively supplying power to said transmitter and receiver at said predefined interval; and maintaining power to said transmitter and receiver to thereby communicate with said remote data processor.

7. A method according to claim 6 further comprising the steps of:

monitoring communications between other portable data readers and said remote data processor; and determining from said monitored communications if a poll is to be received by said portable data reader within said predetermined time; and wherein said maintaining step comprises maintaining power to said transmitter and receiver to thereby communicate with said remote data processor if said determining step determines that a poll is to be receive by said portable data reader within said predetermined time.

* * * * *

UNITED STATES PATENT AND TRADEMARK OFFICE
CERTIFICATE OF CORRECTION

PATENT NO. : 5,659,761

DATED : August 19, 1997

INVENTOR(S) : DeArras, et al.

It is certified that error appears in the above-identified patent and that said Letters Patent is hereby corrected as shown below:

Column 9, line 4, delete "lock".

Column 9, line 19, delete "108d" and insert --107g-- therefor.

Column 11, line 17, "255" should not be in bold type.

Column 11, line 22, after "communication" insert --ports and will not--.

Column 11, line 22, delete "with the conflict".

Column 12, line 48, delete "14,000" and insert --14,400-- therefor.

Column 12, last line, delete "East" and insert --last-- therefor.

Column 14, line 3, delete "dogs" and insert --does-- therefor.

UNITED STATES PATENT AND TRADEMARK OFFICE
CERTIFICATE OF CORRECTION

PATENT NO. : 5,659,761
DATED : August 19, 1997
INVENTOR(S) : DeArras, et al.

It is certified that error appears in the above-identified patent and that said Letters Patent is hereby corrected as shown below:

Column 14, line 10, after "master" omit the comma (,).

Signed and Sealed this

Nineteenth Day of May, 1998

Attest:

BRUCE LEHMAN

Attesting Officer

Commissioner of Patents and Trademarks